United States Patent
Lecea et al.

(10) Patent No.: US 6,826,950 B2
(45) Date of Patent: Dec. 7, 2004

(54) FUEL QUALITY SENSOR ASSOCIATED WITH A HOUSING IN FUEL DELIVERY SYSTEM

(75) Inventors: Oscar Alfonso Lecea, Grand Blanc, MI (US); Steven Douglas Thomson, El Paso, TX (US); Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/356,037

(22) Filed: Jan. 31, 2003

(65) Prior Publication Data
US 2004/0149023 A1 Aug. 5, 2004

(51) Int. Cl.[7] ............................................. G01M 19/00
(52) U.S. Cl. ...................................................... 73/118.1
(58) Field of Search ........................................ 73/118.1

(56) References Cited

U.S. PATENT DOCUMENTS

| | | | | | |
|---|---|---|---|---|---|
| 4,915,084 | A | * | 4/1990 | Gonze | 123/575 |
| 5,033,293 | A | * | 7/1991 | Honma et al. | 73/118.1 |
| 5,291,869 | A | * | 3/1994 | Bennett | 123/527 |
| 5,394,844 | A | * | 3/1995 | Akimoto | 123/179.3 |
| 5,759,024 | A | * | 6/1998 | Robinson | 431/247 |
| 5,944,159 | A | * | 8/1999 | Schneider et al. | 192/85 C |
| 6,057,693 | A | * | 5/2000 | Murphy et al. | 324/663 |
| 6,092,365 | A | * | 7/2000 | Leidel | 60/39.63 |
| 6,520,166 | B1 | | 2/2003 | Karau et al. | |
| 2003/0020494 | A1 | * | 1/2003 | Desmier et al. | 324/667 |
| 2003/0189969 | A1 | * | 10/2003 | Lin et al. | 374/54 |

OTHER PUBLICATIONS

"Medium–Duty Diesel Common Rail (DCR) System", www.delphi.com, Sep. 2003.*

* cited by examiner

*Primary Examiner*—Michael Cygan
(74) *Attorney, Agent, or Firm*—Jimmy L. Funke

(57) ABSTRACT

An apparatus monitors at least one fuel quality characteristic of fuel passing through a fuel delivery system of a motor vehicle. The apparatus includes a fuel rail assembly connectable to the fuel delivery system of the motor vehicle. A fuel rail assembly has at least one housing associated with either a pressure regulator or an accumulator. A sensor is associated with the fuel rail assembly for measuring at least one characteristic of fuel quality of fuel passing through the fuel rail assembly. At least one characteristic includes temperature and/or impedance. The sensor can include a pair of plates spaced from one another by a gap of between approximately 0.5 mm to approximately 1.0 mm, inclusive, for measuring impedance across the gap.

5 Claims, 2 Drawing Sheets

FUEL QUALITY SENSOR ASSOCIATED WITH A HOUSING IN FUEL DELIVERY SYSTEM

TECHNICAL FIELD

The present invention relates to an apparatus for monitoring fuel within a fuel delivery system of a motor vehicle, and more particularly, to a fuel quality sensor associated with a housing in a fuel delivery system for measuring a characteristic corresponding to fuel quality.

BACKGROUND OF THE INVENTION

Fuels for internal combustion engines are composed of a mixture of hydrocarbon compounds and various additives that can be included for improving the properties. Modern internal combustion engines are capable of processing fuels of differing quality, which can be a result of various additives and hydrocarbon compounds in the fuel. For example, the operational characteristics of an internal combustion engine will vary depending on the proportion of the different hydrocarbons in the fuel. Thus, automotive manufacturers desire to monitor fuel quality.

Fuel quality is known to vary as a measure of impedance and temperature. A fuel composition sensor responsive to the dielectric constant of a mixture of two fuel components generates a fuel composition signal indicating the relative concentration of the two fuels. A capacitive sensor is known where the fuel mixture to be sensed forms the dielectric between capacitor plates. If one of the fuels has a significant variation of dielectric constant with temperature, the output signal of such a sensor may vary with fuel temperature at high concentrations of the one fuel. The output of a capacitive sensor for a fuel mixture of gasoline and methanol becomes significantly more dependent on fuel temperature as the concentration of methanol increases. Therefore, it is known to include a fuel temperature sensor in the same package so that the fuel composition sensor output can be corrected for fuel temperature as required.

Known sensors will usually fail by shorting to one of the power supply terminals where constant limit references can be acceptable to signal sensor failure. However, contaminated fuel may not produce the same failure mode. In particular, the contaminated fuel can produce an output voltage, outside the expected voltage range at a particular fuel temperature, but not at or near either of the voltage supply voltages.

SUMMARY OF THE INVENTION

According to the present invention, the sensor is incorporated into the housing of a fuel pressure regulator or accumulator or any other fuel delivery controlling, sensing, or handling device in the fuel handling system, thereby reducing the number of connections required in the fuel system from a stand alone sensor. This configuration also reduces the total under hood volume required when compared to discrete components. The present invention provides a compact low cost package for a fuel sensor. The present invention reduces the number of connections required in the fuel system. In the preferred embodiment, the sensor is mounted in close proximity to the fuel injectors. The sensor according to the present invention measures impedance and temperature in a single sensor package. The sensor uses two or more plates spaced from one another by a gap of approximately 0.5 mm to approximately 1.0 mm and measures impedance across the gap(s), while a temperature sensor incorporated into the package measures the temperature. An apparatus according to the present invention monitors a fuel quality characteristic with a combined impedance and temperature sensor mounted within a fuel delivery system having a fuel pressure regulator and/or an accumulator. The combined impedance and temperature sensor is housed within either the fuel pressure regulator or the accumulator for measuring a characteristic corresponding to fuel quality. Fuel quality is known to vary as a function of impedance and temperature.

An apparatus according to the present invention monitors fuel quality within a fuel delivery system of a motor vehicle. The apparatus includes a housing associated with at least one of a fuel pressure regulator and an accumulator. A sensor is supportable by the housing to be exposed to fuel passing through the fuel delivery system of the motor vehicle for measuring at least one characteristic of fuel corresponding to fuel quality. The apparatus can include a fuel rail assembly connectable to the fuel delivery system of the motor vehicle, where the fuel rail assembly includes a pressure regulator and an accumulator. According to the present invention, a sensor is associated with the fuel rail assembly for measuring at least one characteristic of fuel quality of fuel passing through the fuel rail. In the preferred configuration, the sensor includes a pair of plates spaced from one another by a gap of between approximately 0.5 mm to approximately 1.0 mm inclusive for measuring impedance across the gap.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

It is desirable to monitor the fuel quality within a fuel delivery system of a motor vehicle to compensate for the differing quality of fuel so that the internal combustion engine can operate without appreciable adverse effects when running on an acceptable range of fuel quality being delivered to the internal combustion engine. It would be desirable to obtain an instantaneous fuel quality reading for fuel being delivered to the internal combustion engine of a motor vehicle. Previously known fuel quality detectors operate on an unsmooth running method where the rotational speed is evaluated when the internal combustion engine starts, and compensation is achieved by changing the injection time period or the injection timing.

Figure 1:
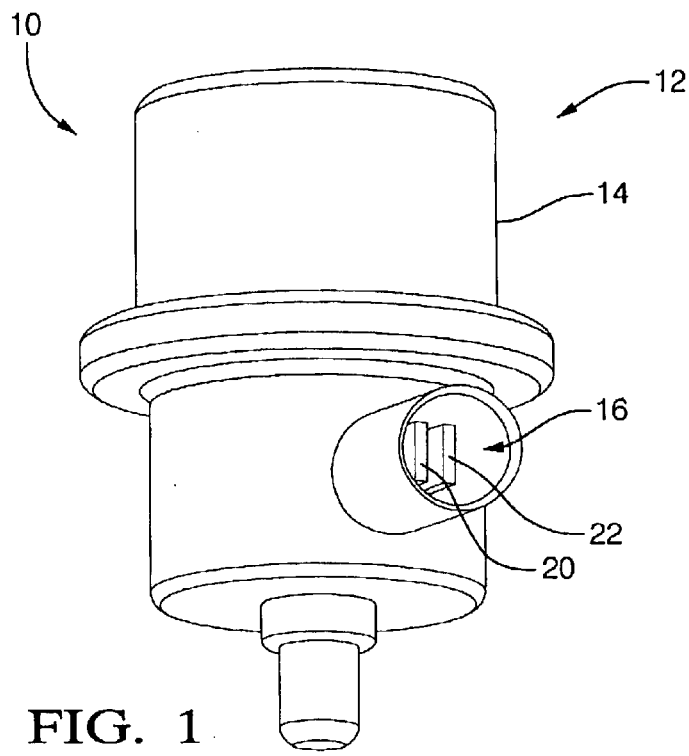
FIG. 1 is a perspective view of a fuel quality sensor mounted with respect to a housing according to the present invention.
Figure 2:
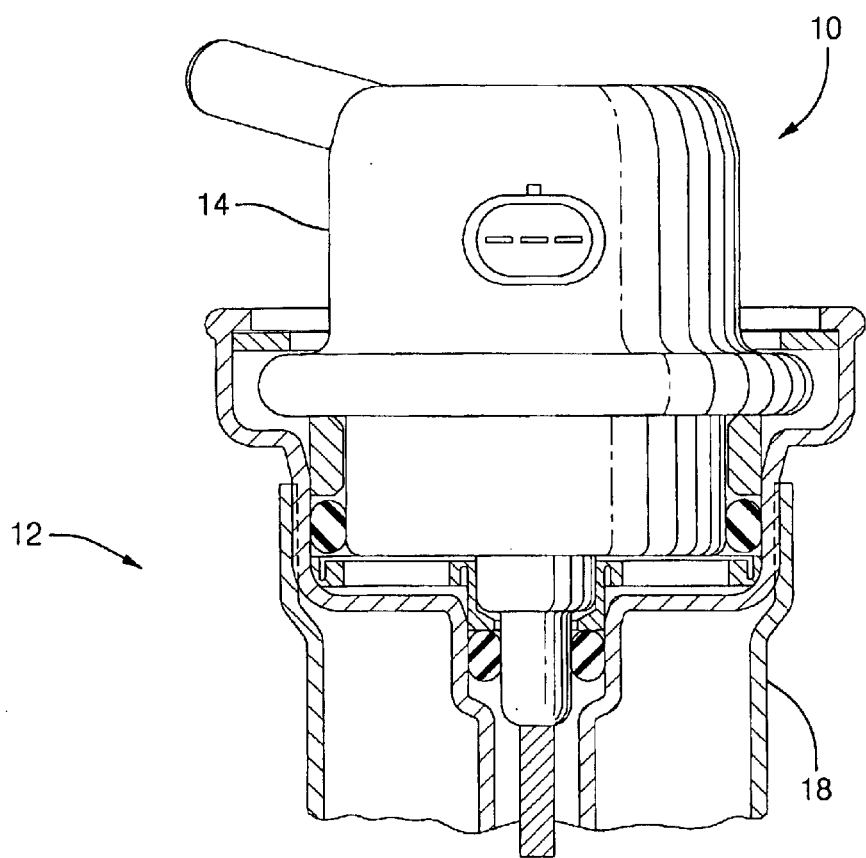
FIG. 2 is the housing according to the present invention connected to a fuel rail assembly.
Figure 3:
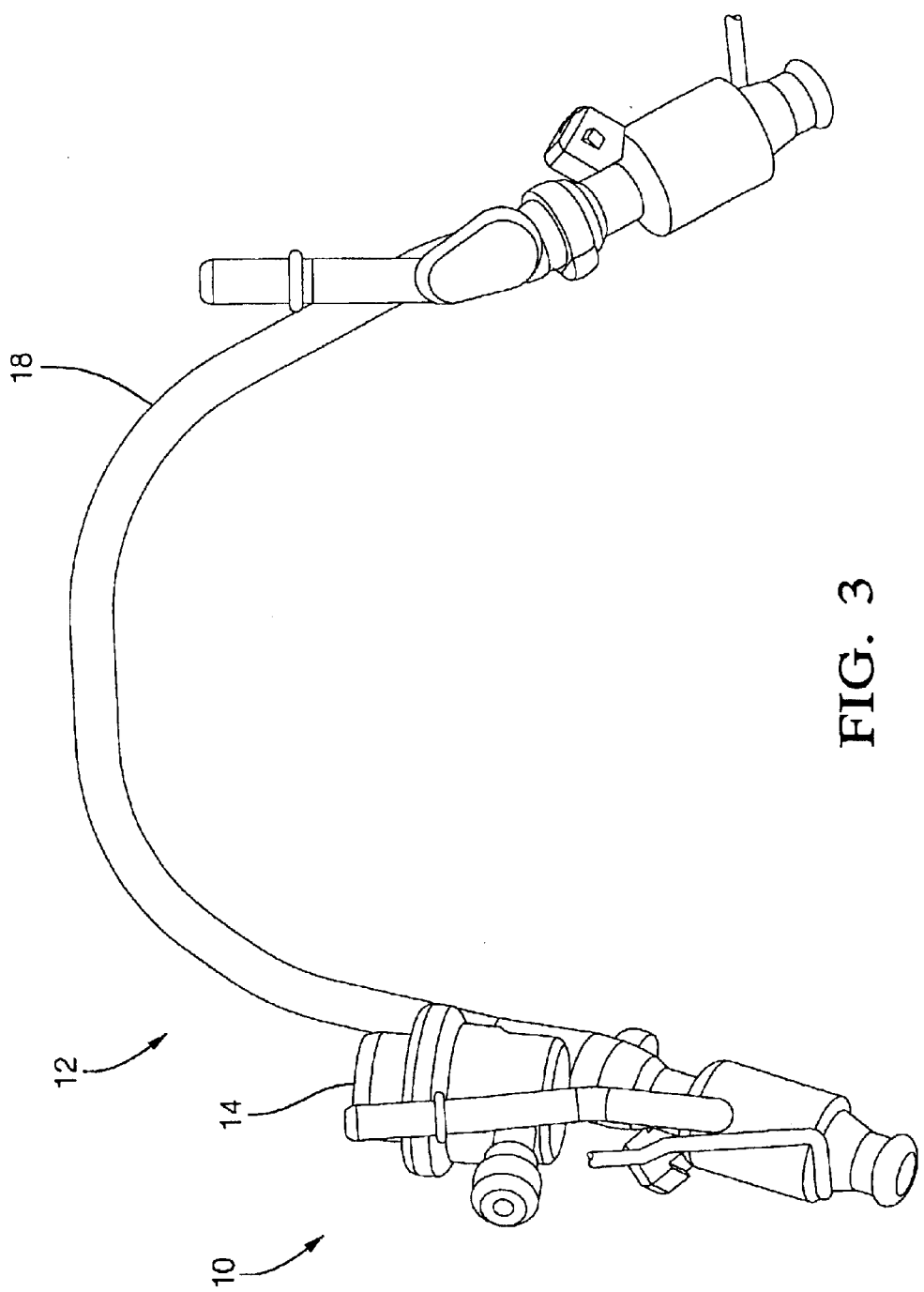
FIG. 3 is a fuel rail assembly including a housing corresponding to at least one of a fuel pressure regulator and accumulator according to the present invention.

Referring now to FIGS. 1–3, an apparatus 10 according to the present invention monitors fuel quality within a fuel delivery system 12 of a motor vehicle. The apparatus 10 includes a housing 14 associated with at least one of a fuel pressure regulator or an accumulator. A sensor 16 is supported by the housing 14 to be exposed to fuel passing through the fuel delivery system 12 of the motor vehicle for measuring at least one characteristic of fuel corresponding to fuel quality.

According to the present invention, the characteristic of fuel corresponding to fuel quality can include at least one of impedance, temperature, and the combination of impedance and temperature. The housing 14 can be associated with either the fuel pressure regulator or the accumulator or any other fuel delivery controlling, sensing, or handling device in the fuel handling system 12. Preferably, the sensor 16 is positioned within the housing 14. The housing 14 is preferably connected into a fuel rail assembly 18 of the fuel delivery system 12 for the motor vehicle.

The sensor 16 is associated with the fuel rail assembly 18 for measuring at least one characteristic of fuel quality of fuel passing through the fuel rail assembly. The sensor 16 can include a pair of plates 20, 22 spaced from one another by a gap for measuring impedance across the gap. Preferably, the gap between the pair of spaced plates 20, 22 is between approximately 0.5 mm to approximately 1.0 mm inclusive.

The apparatus 10 according to the present invention monitors at least one fuel quality characteristic of fuel passing through a fuel delivery system 12 of a motor vehicle. The apparatus 10 includes a fuel rail assembly 18 connectable to the fuel delivery system of the motor vehicle. The fuel rail assembly can include a pressure regulator and an accumulator. The sensor 16 is associated with the fuel rail assembly 18 for measuring at least one characteristic of fuel quality for fuel passing through the fuel rail assembly. The characteristic of fuel quality can include at least one of impedance, temperature, and the combination of impedance and temperature. The sensor 16 can be supported by a housing 14 forming part of the fuel rail assembly 18, such as a pressure regulator or accumulator. In the preferred configuration, the sensor 16 is positioned within the housing 14, such as the pressure regulator or accumulator. The sensor 16 can include a pair of plates 20, 22 spaced from one another by a gap between approximately 0.5 mm to approximately 1.0 mm inclusive for measuring impedance across the gap.

The fuel rail is mounted with respect to the engine to distribute fuel to the individual injectors. The fuel is delivered to the input end of the fuel rail by fuel supply lines, goes though the rail, and is operably in communication with the fuel pressure regulator. The fuel pressure regulator keeps the pressure to the injectors at a constant pressure. Excess fuel is returned to the fuel tank. The fuel pressure regulator can be a diaphragm-operated relief valve with injector pressure on one side and manifold pressure on the other side. The function of the fuel pressure regulator is to maintain a constant pressure differential across the injectors at all times, by controlling the flow in the return line to the fuel tank. The pressure regulator is typically mounted as a portion of the fuel rail assembly. Of course, in so-called "returnless" systems, the pressure regulator is mounted remote from the fuel rail assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a fuel delivery system of a motor vehicle, a pressure regulator adapted for monitoring fuel quality, said pressure regulator comprising:
   a housing associated with the fuel delivery system of the motor vehicle; and
   an impedance sensor mounted in the housing and exposed to fuel passing through the fuel delivery system of the motor vehicle for measuring at least one characteristic of fuel corresponding to fuel quality.

2. The apparatus of claim 1 further comprising a temperature sensor mounted in the housing.

3. The apparatus of claim 1 wherein the housing is connected into a fuel rail assembly.

4. The apparatus of claim 1 wherein the sensor further comprises at least a pair of plates spaced from one another by a gap of between approximately 0.5 mm to approximately 1.0 mm inclusive for measuring impedance across the gap.

5. A fuel pressure regulator mounted to a fuel rail assembly of a motor vehicle and adapted for monitoring at least one fuel quality, said fuel pressure regulator comprising:
   a housing; and
   a sensor mounted in the housing for measuring impedance of fuel passing through the fuel rail assembly, the sensor comprising a pair of plates spaced from one another by a gap of between approximately 0.5 mm to approximately 1.0 mm, inclusive, for measuring impedance across the gap.

* * * * *